April 19, 1960 — W. BOCK ET AL — 2,933,048

HAND PUMP FOR WINDSHIELD WASHING APPARATUS

Filed July 28, 1958

INVENTORS
WILLY BOCK
ALFRED KOHLER
BY Dicke and Craig
ATTORNEYS

2,933,048

HAND PUMP FOR WINDSHIELD WASHING APPARATUS

Willy Bock and Alfred Kohler, Bietigheim, Wurttemberg, Germany, assignors to SWF-Spezialfabrik für Autozubehör Gustav Rau G.m.b.H., Bietigheim, Wurttemberg, Germany Application July 28, 1958, Serial No. 751,398

Claims priority, application Germany July 27, 1957

5 Claims. (Cl. 103—148)

The present invention relates to a hand pump for windshield washing apparatus, especially for automobiles and the like.

The pumps of this type as were known prior to this invention usually consisted of a hollow rubber body which could be compressed by means of a plunger which was operated by a handle. These prior rubber bodies were usually made of a single piece of material and had to be secured on the rear side of the dashboard of a car by means of a special bracket to permit the pumping stroke to be carried out by the plunger which was guided within the dashboard or within a long bushing which was mounted thereon. Such a pump thus became rather expensive and required behind the dashboard a very deep space which often was not available.

It is an object of the present invention to provide a hand pump for a windshield washing apparatus which is of a much simpler design and may also be mounted in a car much more easily than similar pumps as were previously made.

This object of the present invention is attained by extending the pump plunger through the hollow rubber body and by mounting it so as to act upon the rear wall portion of the rubber body.

Another feature of the present invention consists in mounting the pump body on a base plate which may also serve as a bottom or covering plate of the open hollow rubber body, and which further permits the pump to be mounted directly on the rear wall of the dashboard.

A further feature of the present invention consists in providing the pump body with a screw bushing of a special design which may be screwed centrally into the pump body to mount the same on the dashboard, and which also serves to guide the pump plunger.

Still another feature of the invention consists in designing the hollow pump body in the form of an annular chamber, the outer and inner walls of which are secured to the base plate. This annular chamber is preferably made of a conical shape so as to have at the rear end a relatively small surface area upon which the pump plunger acts by means of a plate.

Figure 1:
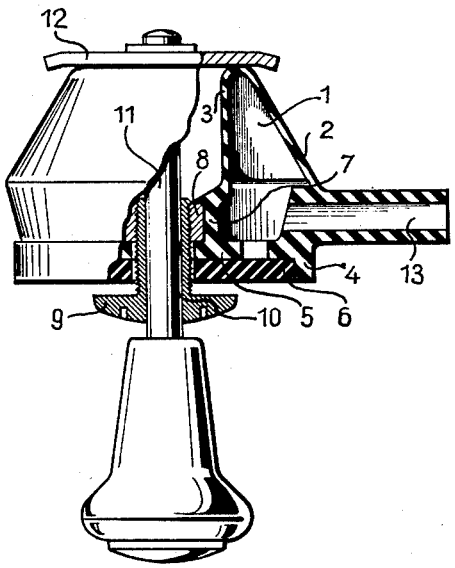
Figure 2:
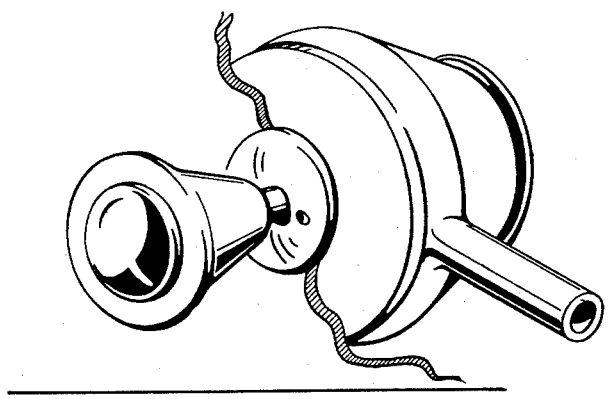

Further objects, features, and advantages of the present invention will appear from the following detailed description thereof, particularly when read with reference to the accompanying drawings, in which:

Figure 1 shows a side view, partly in cross section, of the pump according to the invention, while Figure 2 shows a perspective view of the pump and illustrates the installation thereof on a dashboard of a car.

Referring to the drawings, the pump body consists of an annular rubber element forming an annular pump chamber 1 with relatively thin walls. The outer wall 2 of this rubber element is conically inclined, converging toward its rear end where it merges through a rounded edge portion with the cylindrical inner wall 3. The annular chamber 1 is open toward the front but provided with reinforced flanged portions 4 and 5 at the front end. These flanged portions serve as supporting surfaces upon which a cover plate 6 of a thicker or less resilient rubber may be secured, for example, by being cemented or vulcanized thereto, so as to close chamber 1 tightly toward the front. A part 7 of the cylindrical inner wall adjacent to the flanged portion 5 is likewise reinforced and provided with a bushing 8 with inner screw threads therein into which a headed screw 9 is inserted which has a central bore 10 which forms a bushing for guiding the pump plunger 11. The end of plunger 11 has a metallic plate 12 secured thereto which rests and acts upon the rear edge portion of the wall of the annular chamber 1.

As illustrated in Figure 2, the pump may be secured to a plane wall, for example, the rear side of a dashboard of a car, solely by means of screw 9 and without any additional brackets or other supporting means. By pulling upon the handle of plunger 11, plate 12 will act upon the walls of the pump chamber 1 from the rear and thereby compress the latter to exert a pumping stroke. The washing apparatus as such is connected to the pump through a fitting 13 which may also consist of rubber and may be integral with the walls of the pump body. Thus it will be seen that the entire pump body, with the possible exception of the base plate 6, may be molded as a single element, and even this base plate 6 may form an integral part of the rubber body.

Although our invention has been illustrated and described with reference to the preferred embodiment thereof, we wish to have it understood that it is not limited to the details of such embodiment, but is capable of numerous modifications within the scope of the appended claims.

Having thus fully disclosed our invention, what we claim is:

1. A hand pump for a windshield washing apparatus particularly for motor vehicles provided with a relatively stationary part, comprising a flexible hollow body and plunger means for compressing said hollow body, said hollow body including an inner wall and an outer wall spaced radially outwardly from said inner wall and forming an annular chamber therebetween, said two walls being jointed with each other at one end of said annular chamber, said plunger means extending on the inside of said inner wall and including plate means operatively abutting against said one end of the hollow body, closure plate means for sealing the other end of said annular chamber provided with guide bore means for guiding said plunger means, fastening means in said closure means for securing said pump to said relatively stationary part, and means forming an inlet and discharge conduit operatively connected with said chamber and adapted to draw fluid into said chamber or to discharge fluid therefrom upon actuation of said plunger means.

2. A hand pump for a windshield washing apparatus according to claim 1, wherein said hollow body is made of a relatively soft rubber-like material, said closure plate means being made of a rubber-like material having a lesser resiliency than the material used for said hollow body.

3. A hand pump for a windshield washing apparatus according to claim 1, wherein said bore means is formed simultaneously by said closure plate means and said inner wall.

4. A hand pump for a windshield washing apparatus according to claim 1, wherein said closure plate means for sealing the other end of said chamber is vulcanized to said inner and outer walls, and wherein said guide bore means for guiding said plunger means is formed partly in said inner wall and partly in said closure plate means.

5. A hand pump for a windshield washing apparatus according to claim 1, wherein said fastening means includes an internally threaded bushing provided in said guide bore means, guide bushing means including flange means threadably secured in said bushing means and provided with an internal bore therein for guiding said plunger means and for securing said pump to said relatively stationary part.

References Cited in the file of this patent

UNITED STATES PATENTS 85,832  Keller _____ Jan. 12, 1869

FOREIGN PATENTS 526,772  France _____ Oct. 13, 1921